Nov. 29, 1966     H. S. SPACIL     3,288,634
METHOD OF FORMING A COMPOSITE MEMBER
Filed Jan. 7, 1963
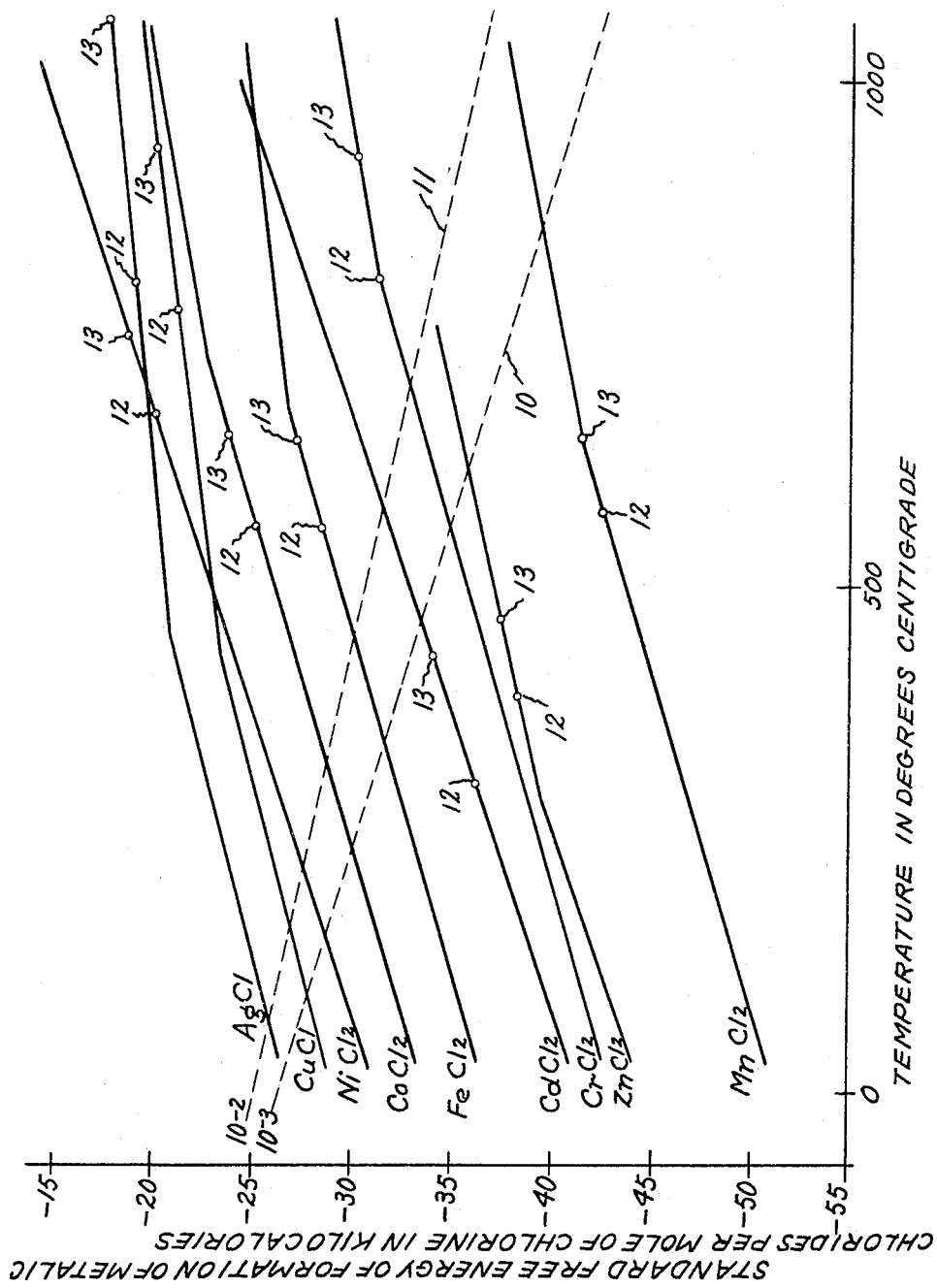
Inventor:
Henry S. Spacil,
by Paul R. Webb, II
His Attorney.

United States Patent Office 3,288,634
Patented Nov. 29, 1966

3,288,634
METHOD OF FORMING A COMPOSITE MEMBER
Henry S. Spacil, Schenectady, N.Y., assignor to General
Electric Company, a corporation of New York
Filed Jan. 7, 1963, Ser. No. 249,705
7 Claims. (Cl. 117—123)

This invention relates to methods of forming composite members and more particularly to methods of forming composite members including a solid or perforated metallic or non-metallic refractory substrate with a coherent metallic layer thereon.

It would be desirable to produce a composite member having a solid or a perforated metallic substrate with a coherent metallic layer thereon. It would also be advantageous to provide such a composite member having a solid or a perforated non-metallic refractory substrate with a coherent metallic layer thereon. A metallic substrate can be coated with a metallic layer by electro-deposition or by electrolysis. Similarly, non-metallic refractory substrates can be coated with a metallic layer by electrodeposition. However, it would be desirable to provide such substrates with uniform coherent, metallic layers in a simple but reproducible manner. The present invention is directed to forming such composite members.

In my copending patent application, Serial No. 249,070, filed January 2, 1963, now abandoned, there is disclosed and claimed a method of forming coherent metallic members. My copending application is assigned to the same assignee as the present application. In my copending application, a method is disclosed and claimed for forming a coherent metallic member which comprises forming at least one metallic halide into a preshaped member, positioning the preshaped member within a chamber, introducing into the chamber a stream of gas, the essential active reducing ingredient of which is hydrogen, and heating the preshaped member to a temperature in a limited temperature range. The lower limit of this temperature range is that set of temperature conditions below which there is insignificant reduction of the metal halide and the upper limit thereof is that set of temperature conditions above which excessive evaporavtion of the metal halide ocurs. Thus, the lower limit is determined by the ratio of the hydrogen halide partial pressure to the hydrogen partial pressure, when these gases are in equilibrium with both the metal of the metal halide of the preshaped member and the metal halide. The range of values for the aforemetioned ratio must be from 0.001 to 0.01. The upper limit of the operating temperature range is that set of temperature values above which the rate of evaporation of the metal halide exceeds the rate of reduction of the metal halide by the hydrogen whereby the preshaped member is converted to a coherent metallic member.

In my copending application, Serial No. 249,071, filed January 2, 1963, there is disclosed and claimed a method of forming a composite member. This copending application is assigned to the same assignee as the present application. In this copending application, a method is disclosed and claimed for forming a composite member which comprises providing a substrate, forming at least one metallic halide into a preshaped powder layer on at least one surface of the substrate thereby providing a coated substrate, positioning the coated substrate within a stream of gas, the essential active reducing ingredient of which is hydrogen, and heating the coated substrate to a temperature in a preselected temperature range. As in the case of application Serial No. 249,070 the lower limit is determined by the ratio of the hydrogen halide partial pressure to the hydrogen partial pressure, when these gases are in equilibrium with both the metal of the metallic halide on the substrate and with the metallic halide on the substrate. The range of values for this ratio varies from 0.001 to 0.01. The upper limit of the operating temperature range is that set of temperature values above which the rate of evaporation of the metallic halide exceeds the rate of reduction of the metallic halide by the hydrogen whereby the preshaped powder layer is converted to a coherent metallic layer on the substrate.

It is an object of my invention to provide a method of forming a composite member including a substrate with a coherent metallic layer thereon.

It is an object of my invention to provide a method of forming a composite member including the application of a coating of slurry on the substrate.

It is a further object of my invention to provide a method of forming a composite member including reduction of a coating of slurry on the substrate to a coherent metallic layer.

In carrying out my invention in one form, a method of forming a composite member comprises providing a substrate, applying a slurry of at least one metallic halide in a non-aqueous vehicle as a coating over at least one surface of the substrate, heating the coated substrate to evaporate the non-aqueous vehicle thereby providing a metallic halide layer on the substrate, positioning the substrate with the metallic halide layer thereon within a stream of gas, the essential active reducing ingredient of which is hydrogen, and heating the substrate with the metallic halide layer thereon to a temperature at least as high as the temperature range wherein the ratio of the hydrogen halide partial pressure to the hydrogen partial pressure, when these gases are in equilibrium with both the metal of the metallic halide on the substrate and with the metallic halide on the substrate, has a value in the range from 0.001 to 0.01. The upper limit of the operating temperature range is the set of temperature values above which the rate of evaporation of the metallic halide exceeds the rate of reduction of the metallic halide by the hydrogen whereby the layer is converted to a coherent metallic layer on the substrate.

These and various other objects, features and advantages of the invention will be better understood from the following description taken in connection with the accompanying drawing in which:

The single figure of the drawing is a graph plotting the standard free energy of formation of metallic chlorides per mole of chlorine in kilocalories versus temperature in degrees centigrade.

The present invention is directed to methods of forming composite members including solid or perforated metallic or non-metallic refractory substrates with a coherent metallic layer thereon. The coherent metallic layer is formed on such substrates by the subsequent reduction of their respective halides under specific conditions. For example, nickel, cobalt, chromium, silver, copper and iron are produced from the respective halides. Various alloys are also formed by appropriate mixtures of the respective halides.

I found unexpectedly that a composite member could be formed from a solid or a perforated metallic or a non-metallic refractory substrate with a coherent metallic layer thereon. In the formation of such a composite member, a slurry is prepared of at least one metallic halide in a non-aqueous vehicle, such as methanol, and applied as a coating over at least one surface of a solid or a perforated metallic or a non-metallic refractory substrate to provide a coated substrate. The application of the slurry is accomplished by painting, spraying, or dipping the substrate. The slurry coating is reduced subsequently to a coherent metallic layer. When a thin coherent metallic layer is desired, the application of the slurry is followed by the removal of excess slurry. Suitable nonaqueous vehicles, such as methanol, ethanol, amyl acetate and carbon tetrachloride are employed in the preparation of the slurry. The coated substrate is then heated in an air atmosphere at a temperature sufficient to evaporate the vehicle thereby providing a metallic halide layer having the shape of the coating of slurry. With a thick layer, it may be desirable to compact the metallic halide layer. For example, a suitable temperature is about 100° C. The substrate with the metallic halide layer thereon is then positioned within a stream of gas, the essential active reducing ingredient of which is hydrogen. For example, a hydrogen furnace is employed for this purpose. It is necessary to employ a temperature range within the furnace whereby the reduction of the halide tends to occur to a significant extent. I found further that the substrate with the metallic halide layer must be heated to a temperature in a temperature range having a lower limit determined by the ratio of the hydrogen halide partial pressure to the hydrogen partial pressure, when these gases are in the equilibrium with both the metal of the metallic halide on the substrate and with the metallic halide on the substrate such that the ratio has a value in the range from 0.001 to 0.01. I found also that the upper temperature limit is determined by a greater loss of metal by halide evaporation than reduction to metal by hydrogen. Under these conditions, I discovered that a coating of metallic halide slurry layer could be formed into a coherent metallic layer on the substrate.

I discovered further that a mixture of metallic halides could also be formed into a slurry layer and reduced under the above conditions to provide a coherent metallic layer. For example, such a halide mixture would include the mixing of at least two metallic halide powders such as nickel chloride and chromium trichloride to provide a mixture in a non-aqueous vehicle which is subsequently formed into a preshaped layer on the substrate. The resulting coherent metallic layer is a nickel-chromium alloy. The subject method is also applicable to forming at least one mixed metallic halide into a slurry layer which is reduced subsequently under the above conditions to provide a coherent metallic layer. Such a mixed halide would include at least two metallic components in the halide, such as nickel and cobalt.

At least one metallic halide and a metal which will react with the metal subsequently reduced from the metallic halide are also formed into a slurry layer as disclosed above and reduced to a coherent metallic layer. In the formation of such a slurry coating, at least one metallic halide, a mixture of metallic halides or at least one mixed metallic halide is employed. The reacting metal can be a single metal, a metal mixture, or a metallic alloy, or derived from a metal compound, a metal compound mixture, or a mixed metal compound. For example, a nickel halide, $NiCl_2$, and a copper halide, $CuCl$, comprising a mixture of metallic halides and a reacting metal zirconium in the form of zirconium hydride powder in a non-aqueous vehicle are formed together into a slurry, which is applied as a coating and which is reduced in the manner described above. A reacting metal in the form of a mixed metallic alloy such as an iron-tungsten-carbon alloy in powder form and a mixture of metallic halides of nickel chloride, ferrous chloride, chromium chloride, and cobalt chloride are formed together into a slurry layer. The coherent metallic layer which is formed from the slurry layer is a nickel-iron-chromium-cobalt-tungsten-carbon alloy.

I found further that at least one inert metallic filler or at least one inert non-metallic filler can be combined with at least one metallic halide in a non-aqueous vehicle to form the slurry layer. Furthermore, I found that such a metallic or non-metallic filler could be combined with at least one metallic halide and at least one other reacting metal to form a coherent metallic layer. For example, a metallic filler of molybdenum in powder form is mixed with a metalic halide such as a copper chloride to produce a coherent metallic layer of copper metal with molybdenum particles therein. A non-metallic filler of magnesium silicate powder is combined with a mixture of metallic halides of nickel chloride and chromium chloride to form upon subsequent reduction a nickel-chromium alloy layer with magnesium silicate particles therein. A non-metallic filler of titanium oxide powder is combined with a metal compound of titanium hydride and with a mixture of metallic halides of ferrous chloride, nickel chloride, and cobalt chloride to form an iron-nickel-cobalt-titanium alloy layer with titanium oxide particles therein.

In the single figure of the drawing, the standard free energy of formation of metallic chlorides per mole of chlorine in kilocalories is plotted against temperature in degrees centigrade.

Broken lines 10 and 11 set forth a range for the minimum standard free energy of formation of metallic halides per mole of halogen in kilocalories which is necessary for each of the metallic chlorides set forth on the graph to be reduced to its respective coherent metal at a hydrogen pressure of one atmosphere. Broken lines 10 and 11 define a lower temperature limit determined by the ratio of the hydrogen halide partial pressure to the hydrogen partial pressure, when these gases are in equilibrium with both the metal of the metallic halide on the substrate and with the metallic halide on the substrate, such that the ratio has a value ranging from 0.001 to 0.01. On each line identifying a particular metallic chloride, a point 12 defines the temperature at which the vapor pressure of the metallic chloride multiplied by the number of chlorine atoms per metal atom is equal to 0.001. A point 13 on each line defines the temperature at which the vapor pressure of the metallic chloride multiplied by the number of chlorine atoms per metal atom is equal to 0.01. Above the range of temperatures defined by points 12, 13 for any particular metallic chloride, therefore, the rate of evaporation of a metallic halide is excessive. The metallic chlorides for which the points 12 and 13 are plotted to the right and above the lower temperature limit range are reducible to their respective coherent metals without undue loss of metal by evaporation of metallic chloride. The metallic chlorides whose points 12 and 13 are plotted to the left and below the lower temperature limit range are not reducible, because these metallic chlorides will evaporate too rapidly at temperatures high enough for significant reduction to be effected at the desired location on the surface of the substrate. Thus, it is feasible to reduce silver chloride, cuprous chloride, cobalt chloride, ferrous chloride and chromium chloride to their respective coherent metals. It is not feasible to reduce cadmium chloride, zinc chloride or manganese chloride to their respective metals. In the case of the latter materials, these metallic chlorides evaporate more rapidly than reduction of the metal by hydrogen occurs.

While the subject graph sets forth a plurality of metallic chlorides which are suitable in the present process, similar graphs can be prepared for suitable metallic bromides and metallic iodides. In the case of a mixture of metallic chlorides, or a mixed metallic chloride which may be combined with a reacting metal, or a filler or both, employed in a slurry to provide a coherent metallic layer, a temperature is selected from the above graph which temperature is within the respective temperature ranges for reduction of the individual metallic chlorides. It is preferred to reduce the particular chloride or chlorides at a higher temperature within the temperature range to reduce the reduction time.

In accordance with the practice of the present invention, a composite member was produced from a fosterite substrate. A slurry was prepared of nickel dichloride powder and chromium trichloride powder in a non-aqueous vehicle of methanol corresponding to a 4 to 1 ratio of nickel to chromium. The slurry was applied on the substrate by painting to form a preshaped layer. The coated substate was heated to a temperature of 600° C. over a period of sixty minutes which evaporated the vehicle thereby providing a metallic halide layer on the substrate and reduced subsequently the halide layer to a coherent metallic layer on the substrate. This layer comprised 80 percent nickel and 20 percent chromium. The composite body was then heated to a temperature of 1100° C. in hydrogen for thirty minutes to sinter the coherent metallic layer. The heat was discontinued and the apparatus was allowed to cool to room temperature.

Several examples of methods of forming composite members in accordance with the present invention are as follows:

EXAMPLE I

Nickel dichloride power and chromium trichloride powder were mixed together in a non-aqueous vehicle of methanol to form a slurry which was applied on a fosterite substrate by painting to form a coating thereon. A 4 to 1 ratio of nickel to chromium was employed. The coated substrate was heated to a temperature of 600° C. over a period of sixty minutes to evaporate the vehicle thereby providing a metallic halide layer on the substrate and to reduce subsequently the halide layer to a coherent metallic layer. The substrate with this coherent metallic layer of 80 percent nickel and 20 percent chromium was then heated at a temperature of 1100° C. for a period of thirty minutes in a hydrogen atmosphere to sinter the layer. The heat was then discontinued and the apparatus was allowed to cool to room temperature. A composite member having a fosterite substrate with a coherent metallic layer of 80 weight percent nickel and 20 weight percent chromium was produced by this method.

EXAMPLE II

Nickel chloride power and zirconium oxide powder were mixed with a non-aqueous vehicle of ethanol to form a slurry which was applied on a zirconia tube with a nickel screen thereon by painting to form a coating thereover. The coated substrate was heated to a temperature of 750° C. over a period of sixty minutes to evaporate the vehicle thereby providing a metallic halide layer on the zirconia tube and nickel screen and to reduce subsequently the halide layer to a coherent metallic layer. The substrate with the nickel layer was then heated to a temperature of 1150° C. for a period of thirty minutes in a hydrogen atmosphere. The heat was then discontinued and the appartus was allowed to cool to room temperature. A composite member was produced by this method which comprised a zirconia substrate with zirconia particles thereon which particles were surrounded by nickel in a coherent metallic layer.

While other modifications of this invention and variations of method which may be employed within the scope of the invention have not been described, the invention is intended to include such that may be embraced within the following claims.

What I claim as new and desire to secure by Letters Patent of the United States is:

1. A method of forming a composite member which comprises providing a substrate, applying a slurry containing at least one metallic halide in a non-aqueous vehicle as a coating on at least one surface of said substrate thereby providing a coated substrate, heating said coated substrate to evaporate the non-aqueous vehicle and provide a metallic halide layer on said substrate, positioning said substrate with said metallic halide layer thereon within a stream of gas, the essential active reducing ingredient of which is hydrogen, and heating said substrate with said metallic halide layer thereon to a temperature in a temperature range having a lower limit determined by the ratio of the hydrogen halide partial pressure to the hydrogen partial pressure with the hydrogen halide and hydrogen gases being in equilibrium with both the metal of said metallic halide on said substrate and with said metallic halide on said substrate, said ratio having a value of from 0.001 to 0.01, and having as an upper limit the set of temperatures at which the vapor pressure of said metallic hydride multiplied by the number of halogen atoms per metal atom has a value between 0.001 and 0.01 whereby said layer is reduced to a coherent metallic layer on said substrate.

2. A method of forming a composite member which comprises providing a substrate, applying a slurry containing a mixture of metallic halides in a non-aqueous vehicle as a coating over at least one surface of said substrate thereby providing a coated substrate, heating said coated substrate to evaporate the non-aqueous vehicle thereby providing a metallic halide layer on said substrate, positioning said substrate with said metallic halide layer thereon within a stream of gas, the essential active reducing ingredient of which is hydrogen, and heating said substrate with said metallic halide layer thereon to a temperature in a temperature range having a lower limit determined by the ratio of a hydrogen halide partial pressure to the hydrogen partial pressure when the hydrogen halide and hydrogen gases are in equilibrium with the metal of that metallic halide of said mixture on said substrate reducible at the lowest temperature and with that same metallic halide on said substrate, such that said ratio has a value of from 0.001 to 0.01 and having as an upper limit the set of temperatures at which the vapor pressure of such metallic halide of said mixture having the highest vapor pressure multiplied by the number of halogen atoms per atom of metal of such same metallic halide has a value of between 0.001 and 0.01 whereby said layer is reduced to a coherent metallic layer on said substrate.

3. The method of forming a composite member substantially as recited in claim 1 wherein the slurry also contains at least one metal reactive with the metal of metallic halide in the slurry when the latter metal has been produced in the free state.

4. The method of forming a composite member substantially as recited in claim 1 wherein the slurry also contains at least one inert metallic filler.

5. The method of forming a composite member substantially as recited in claim 1 wherein the slurry also contains at least one inert non-metallic filler.

6. The method of forming a composite member substantially as recited in claim 3 wherein the slurry also contains at least one inert metallic filler.

7. The method of forming a composite member substantially as recited in claim 3 wherein the slurry also contains at least one inert non-metallic filler.

References Cited by the Examiner

UNITED STATES PATENTS

| | | | |
|---|---|---|---|
| 1,497,417 | 6/1924 | Weber | 117—107.2 |
| 1,853,369 | 4/1932 | Marshall | 117—22 |
| 2,698,810 | 1/1955 | Lawton | 117—130 X |
| 2,867,037 | 1/1959 | Stauffer | 117—22 |
| 3,107,175 | 10/1963 | Cape | 117—130 |

FOREIGN PATENTS 668,554   3/1952   Great Britain.

ALFRED L. LEAVITT, *Primary Examiner.*

MURRAY KATZ, *Examiner.*

W. L. SOFFIAN, *Assistant Examiner.*